Aug. 2, 1938.   C. P. SIMAS   2,125,402
HEATING DEVICE FOR PERMANENT WAVES
Filed April 17, 1937
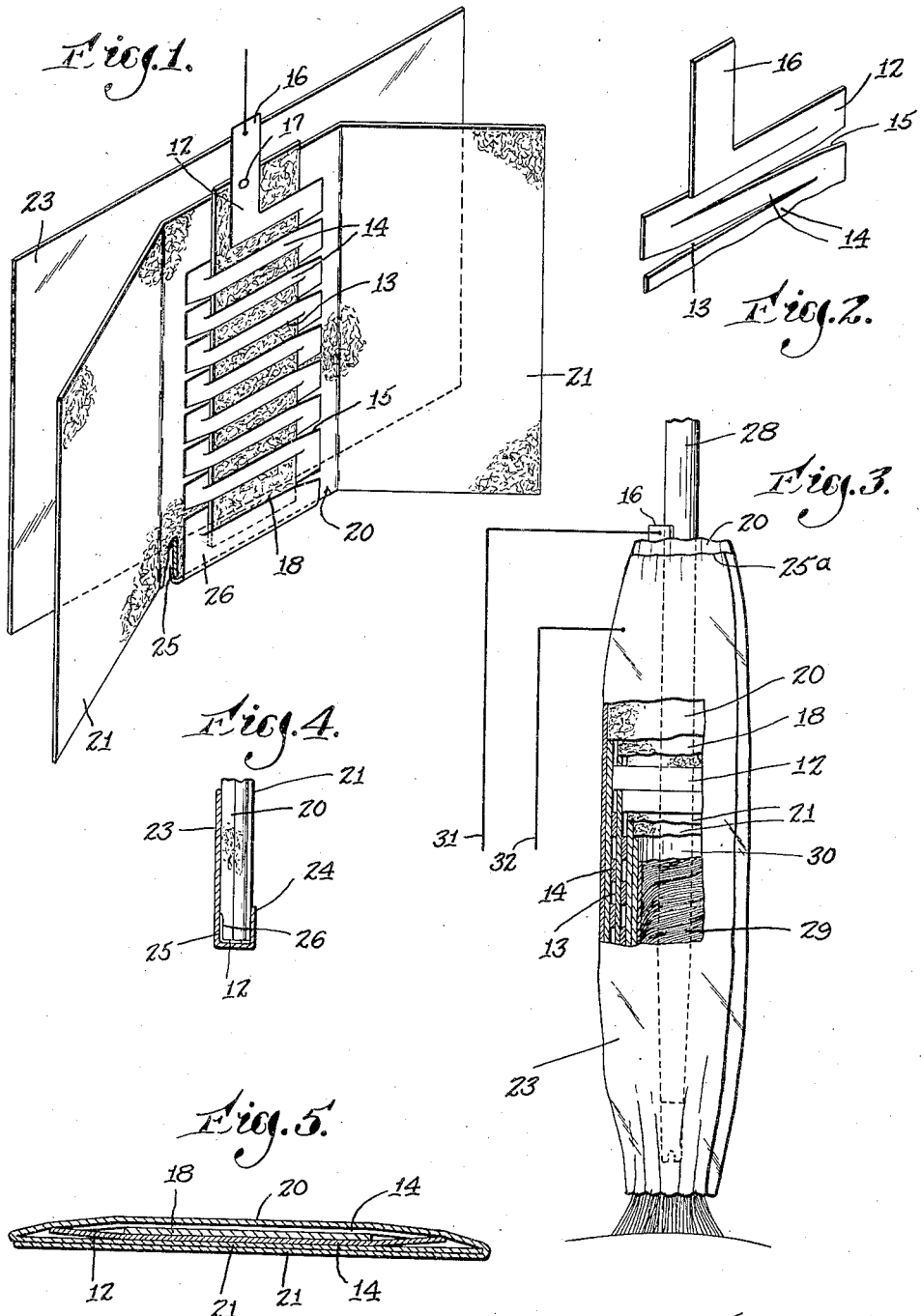
Inventor
Charles P. Simas
by Harold E. Cole
Attorney Patented Aug. 2, 1938

2,125,402

UNITED STATES PATENT OFFICE 2,125,402

HEATING DEVICE FOR PERMANENT WAVES

Charles P. Simas, Taunton, Mass.

Application April 17, 1937, Serial No. 137,457

3 Claims. (Cl. 219—24)

This invention relates to a permanent wave electric heating device.

One object of my invention is to provide a permanent wave electric heating device that is lighter in weight than those in common use, being so light that the combined weight of all of my devices needed to give the hair of one person a permanent wave, is not uncomfortably noticeable, as the heating devices now in general use are. Another object is to so construct my device that it is flexible and may be freely folded to the desired shape and used as a heater around different kinds of curls such as spiral and Croquignole ones, and then unfolded, and used again and again. Still another object is to construct my device of a new combination of materials that is particularly efficient as an electrical heater for permanent wave curls. A further object is to provide such parts for my device and so assemble them that its production cost is low, and, therefore, requires little capital for the hair dresser or barber to equip himself with them.

The foregoing and other objects which will appear as the nature of the invention is better understood, may be accomplished by a construction, combination and arrangement of parts such as is disclosed by the drawing and specification. The nature of the invention is such as to render it susceptible to various changes and modifications, and, therefore, I am not to be limited to said disclosure; but am entitled to all such changes therefrom as fall within the scope of my claims.

In the drawing:

Figure 1 is a perspective view of my heating device disassembled sufficiently to illustrate the various parts forming it.

Figure 2 is a fragmentary view of the heating element for my device.

Figure 3 is a front elevational view of my heating device in use, showing it folded around a tress of hair on a curler.

Figure 4 is a fragmentary view showing the manner of assembly at one end of my device.

Figure 5 is a sectional view through my heating device in folded position; but without the metal foil around it.

As illustrated, an electrical heating element 12 is preferably formed of a thin, flat piece of metal heat resisting material commonly known, and has a number of slits 13 cut therein which divides said heating element into sections 14 extending part way across said element and connected to each other. At the outside end of each slit 13 between the two adjacent sections 14 a larger space 15 is formed, preferably, by cutting away a portion of said sections 14 at their outside ends, so that said sections are definitely spaced apart at their extreme ends. Said heating element 12 has an extending tab 16, preferably integral therewith, through which the electrical current enters, by making a suitable connection therewith, to thereby heat my device. A securing fastener 17 holds said tab 16 firmly in position by extending through it and a spacer 18. This spacer 18 is preferably made of thin sheet asbestos and extends substantially the length of said heating element 12, passing through said slits 13 in back of one said section 14 and in front of the next said section, and so on, as illustrated in Figure 1 of the drawing. This arrangement provides the heating means for my device, and is superior to the commonly used electrical resistance members.

A sheet of asbestos 20 or other non-inflammable material, which is preferably folded to form three folds 21 is wrapped around said heating element 12 and spacer 18, two of said folds 21 being on one side of said heating element and one said fold 21 being on the other, as illustrated in Figure 5 of the drawing. Outside of said sheet of asbestos 20 is a sheet of thin, flexible metal foil 23 which serves as an electrode through which the electrical current passes, the electrical connection being made anywhere on said metal foil sheet 23, one end of which is folded over as at 24 as illustrated in Figure 4 of the drawing, and contacts a turned-over portion 25 of said heating element 12 as at 26. The other end of said metal foil sheet 23 is spaced away as at 25ª from said heating element tab 16.

In Figure 3 of the drawing I have shown my heating device in operative position around a metal curling rod 28 on which a curl 29 is formed, there being a piece of protective paper 30 such as sheet asbestos between my device and said curl 29 to eliminate the possibility of scorching the curl. The electrical circuit is established and the electricity supplied to said heating element 12 through positive and negative connections 31 and 32 respectively, as shown in said Figure 3.

It will thus be seen that my heating device, which is substantially flat when its parts are assembled, is flexible, and can readily and repeatedly be folded around the curl formed on a hair curler, and just as readily unfolded when the curl has set, regardless of the shape of said curl or curler.

While I have enumerated the use of certain materials such as asbestos, which is non-inflammable, and metal foil, which is an electrical conductor, there may be substituted for them other materials having the desired qualities without departing from the principles of the invention and without sacrificing its chief advantages.

What I claim is:

1. A heating device for curls comprising a heating element in the form of a flat piece of metal embodying a plurality of sections connected together, a spacer between said sections, a sheet of asbestos around a portion of said heating element embodying three folds, two of said folds being on one side of said piece of metal and the other said fold being on the other side of said piece of metal, metal foil around a portion of said asbestos sheet, a portion of said metal foil being in contact with said flat piece of metal.

2. A heating device for curls comprising a flat, metal heating element having a plurality of slits therein dividing said heating element into sections connected together, each said slit being closed at one side and open at the other side, an asbestos spacer extending through said slits, passing from the front of said heating element through a said slit to the back of said heating element, said heating element embodying a tab extending outwardly beyond said sections, an asbestos sheet extending around a portion of said heating element embodying three folds, two of said folds being on one side of said heating element and one of said folds on the other, a sheet of metal foil extending around a portion of said asbestos sheet and spaced from said tab, a portion of said metal foil being in contact with said heating element, one end of said metal foil being folded over onto said asbestos sheet, the whole being flexible and adapted to be folded.

3. A heating device for curls comprising a flat metal heating element having a plurality of slits therein dividing said heating element into sections connected together, each said slit being closed at one side and open at the opposite side, the opening at said opposite side being larger than the remainder of said slit, an asbestos spacer extending through said slits, and spaced from the outer sides thereof, passing from the front of said heating element through a said slit to the back of said heating element, said heating element embodying a tab extending outwardly beyond said sections, an asbestos sheet extending around a portion of said heating element embodying three folds, two of said folds being on one side of said heating element and one of said folds on the other, a sheet of metal foil extending around a portion of said asbestos sheet and spaced from said tab, a portion of said metal foil being in contact with said heating element, one end of said metal foil being folded over onto said asbestos sheet, the whole being flexible and adapted to be folded.

CHARLES P. SIMAS.